United States Patent
Iizuka (10) Patent No.: US 12,554,903 B2
(45) Date of Patent: Feb. 17, 2026

(54) TIRE FAILURE PREDICTION SYSTEM AND TIRE FAILURE PREDICTION METHOD

(71) Applicant: The Yokohama Rubber Co., LTD., Tokyo (JP)

(72) Inventor: Hiroshi Iizuka, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 1121 days.

(21) Appl. No.: 17/595,814

(22) PCT Filed: May 26, 2020

(86) PCT No.: PCT/JP2020/020802
§ 371 (c)(1),
(2) Date: Nov. 24, 2021

(87) PCT Pub. No.: WO2020/246320
PCT Pub. Date: Dec. 10, 2020

(65) Prior Publication Data
US 2022/0222396 A1    Jul. 14, 2022

(30) Foreign Application Priority Data
Jun. 3, 2019 (JP) ................. 2019-104024

(51) Int. Cl.
*G06F 30/20* (2020.01)
*B60C 23/20* (2006.01)
(Continued)

(52) U.S. Cl.
CPC .............. *G06F 30/20* (2020.01); *B60C 23/20* (2013.01); *B60Q 9/00* (2013.01); *G06F 2119/08* (2020.01)

(58) Field of Classification Search
CPC .......... G06F 30/20; G06F 30/15; G06F 30/25; G06F 30/27; G06F 30/28;
(Continued)

(56) References Cited

U.S. PATENT DOCUMENTS 5,274,355 A    12/1993 Galan
5,895,846 A *    4/1999 Chamussy .......... B60C 23/0474
                                                    73/146.2
(Continued)

FOREIGN PATENT DOCUMENTS

CN    103547464 A    1/2014
CN    106370344 A    2/2017
(Continued)

*Primary Examiner* — Rehana Perveen
*Assistant Examiner* — Troy A Maust
(74) *Attorney, Agent, or Firm* — Thorpe North & Western (57) ABSTRACT

A tire failure prediction system includes a setting unit configured to set a predetermined master curve indicating a relationship between a speed of a vehicle on which a tire is mounted and a heat build-up temperature of the tire, a determination unit configured to determine a tire condition of the tire based on a difference between the master curve set by the setting unit and a measured value of the heat build-up temperature of the tire, and an update unit configured to update the master curve set by the setting unit. The update unit updates the master curve in a case where the determination unit determines that the tire is normal. In a case where the determination unit determines that the tire is abnormal, a warning unit outputs a warning.

17 Claims, 10 Drawing Sheets

(51) Int. Cl.
   *B60Q 9/00*      (2006.01)
   *G06F 119/08*        (2020.01)
(58) Field of Classification Search
   CPC .. G06F 2111/00–2119/22; B60C 23/20; B60C 23/04; B60Q 9/00
   See application file for complete search history.

(56) References Cited

U.S. PATENT DOCUMENTS

| | | |
|---|---|---|
| 2002/0010537 A1 | 1/2002 | Yamaguchi et al. |
| 2006/0080006 A1* | 4/2006 | Bidou ................ B60W 40/12 701/1 |
| 2010/0287126 A1 | 11/2010 | Kawase |
| 2010/0294032 A1* | 11/2010 | Pannek ................ B60T 8/1725 73/146 |
| 2010/0318335 A1* | 12/2010 | Martin ................ B60C 99/006 703/8 |
| 2017/0368893 A1 | 12/2017 | Kodama et al. |

FOREIGN PATENT DOCUMENTS

| | | | |
|---|---|---|---|
| DE | 101 56 776 A1 | | 5/2003 |
| DE | 69926408 T2 | | 5/2006 |
| DE | 11 2008 003 377 T5 | | 12/2010 |
| JP | 3-262715 A | | 11/1991 |
| JP | H06-211012 A | | 8/1994 |
| JP | 9-79915 A | | 3/1997 |
| JP | 2004-58968 A | | 2/2004 |
| JP | 2004-331009 A | | 11/2004 |
| JP | 2005-96609 A | | 4/2005 |
| JP | 2005096609 A | * | 4/2005 |
| JP | 2010-012934 A | | 1/2010 |
| JP | 2010-143406 A | | 7/2010 |
| JP | 2010-210211 A | | 9/2010 |
| WO | WO 01/17806 A1 | | 3/2001 |
| WO | WO 2016/103453 A1 | | 6/2016 |

* cited by examiner

TIRE FAILURE PREDICTION SYSTEM AND TIRE FAILURE PREDICTION METHOD

TECHNICAL FIELD

The present technology relates to a tire failure prediction system and a tire failure prediction method.

BACKGROUND ART

For tires mounted on trucks and buses, tread separation may be caused by internal failure. The occurrence of tread separation poses a problem in that tire burst may occur, making the vehicle inoperable. Thus, a method for predicting tire internal failure has been proposed (for example, Japan Unexamined Patent Publication No. H06-211012).

The technology described above determines a tire abnormality based on the temperature of tires mounted on a traveling vehicle. The technology described above has room for improvement in predicting failure in the tires with higher accuracy.

SUMMARY

The present technology provides a tire failure prediction system and a tire failure prediction method that can perform tire abnormality determination with higher accuracy to predict failure.

A tire failure prediction system according to an aspect of the present technology includes a setting unit configured to set a predetermined master curve indicating a relationship between a speed of a vehicle on which a tire is mounted and a heat build-up temperature of the tire, a determination unit configured to determine a tire condition of the tire based on a difference between the master curve set by the setting unit and a measured value of the heat build-up temperature of the tire, and an update unit configured to update the master curve set by the setting unit.

Preferably, the update unit updates the master curve in a case where the determination unit determines that the tire is normal.

Preferably, the tire failure prediction system further includes a warning unit configured to output a warning in a case where the determination unit determines that the tire is abnormal.

The update unit may update the master curve set by the setting unit in a case where a difference between the master curve and the measured value of the heat build-up temperature of the tire exceeds a predetermined range, and refrain from updating the master curve set by the setting unit in a case where the difference between the master curve and the measured value of the heat build-up temperature of the tire is equal to or less than a predetermined threshold value.

The vehicle may include a plurality of the tires, and the setting unit may set the master curve for each of the plurality of tires, and the determination unit may compare a difference between the master curve set by the setting unit and the measured value of the heat build-up temperature of the tire with a difference between the master curve for another tire and the measured value of the heat build-up temperature of the other tire to determine the tire condition of the tire.

The determination unit may compare the differences between the tires mounted at positions that are symmetrical in the vehicle and determine the tire condition of the tire.

The determination unit may determine the tire condition of the tire in a predetermined cycle and based on a determination result from the determination unit, determine the tire condition of the tire in a cycle shorter than the predetermined cycle.

The setting unit may set the master curve for the tire of the vehicle based on the master curve for a tire of another vehicle other than the vehicle.

In order to solve the problems described above and achieve an object, a tire failure prediction method according to an aspect of the present technology includes a first step of setting a predetermined master curve indicating a relationship between a speed of a vehicle on which the tire is mounted and a heat build-up temperature of the tire, a second step of determining a tire condition of the tire based on a difference between the master curve set in the first step and a measured value of the heat build-up temperature of the tire, and a third step of updating the master curve set in the first step.

According to the tire failure prediction system and the tire failure prediction method of the present technology, tire abnormality determination can be performed with higher accuracy to predict failure.

DETAILED DESCRIPTION

Embodiments of the present technology are described in detail below with reference to the drawings. In the embodiments described below, identical or substantially similar components to those of other embodiments have identical reference signs, and descriptions of those components are either simplified or omitted. The present technology is not limited by the embodiments. Constituents of the embodiments include elements that are substantially identical or that can be substituted and easily conceived by one skilled in the art. Note that it is possible to combine the configurations described below as desired.

Master Curve

The heat build-up temperature of a tire mounted on a traveling vehicle is proportional to the product of the load applied to the tire and the vehicle speed. The load applied to the tire depends on the vehicle. For example, in a case where the vehicle is a truck, a large cargo carrying capacity corresponds to a heavy load, and a small cargo carrying capacity corresponds to a light load. In a case where the vehicle is a bus, the load is higher when it runs on a route with many passengers, and lower when it runs on a route with few passengers. In this manner, the load applied to the tire is not constant and varies depending on the amount of cargo and the number of passengers. A heavy load increases the amount of heat generated in the tire, leading to an increased likelihood of internal failure of the tire. Additionally, a high vehicle speed increases the amount of heat generated in the tire, leading to an increased likelihood of internal failure of the tire. However, even with the heat build-up temperature of the tire and the vehicle speed known, an unknown load leads to difficulty in determining the likelihood of internal failure of the tire.

Thus, the tire failure prediction system of the present example sets a master curve for a variation in the heat build-up temperature of the tire with respect to the vehicle speed. The master curve indicates the relationship between the speed of the vehicle on which the tire is mounted and the heat build-up temperature of the tire. The master curve indicates a reference value for a variation in temperature with respect to the vehicle speed. Accordingly, in a case where the tire has no abnormality (the tire is normal), the heat build-up temperature of the tire varies along the master curve, which is the reference value, as the vehicle speed increases.

Additionally, the tire failure prediction system of the present example updates the set master curve by machine learning. Using the master curve set and updated allows tire abnormality determination to be performed with higher accuracy to predict failure.

First Embodiment

Figure 1:
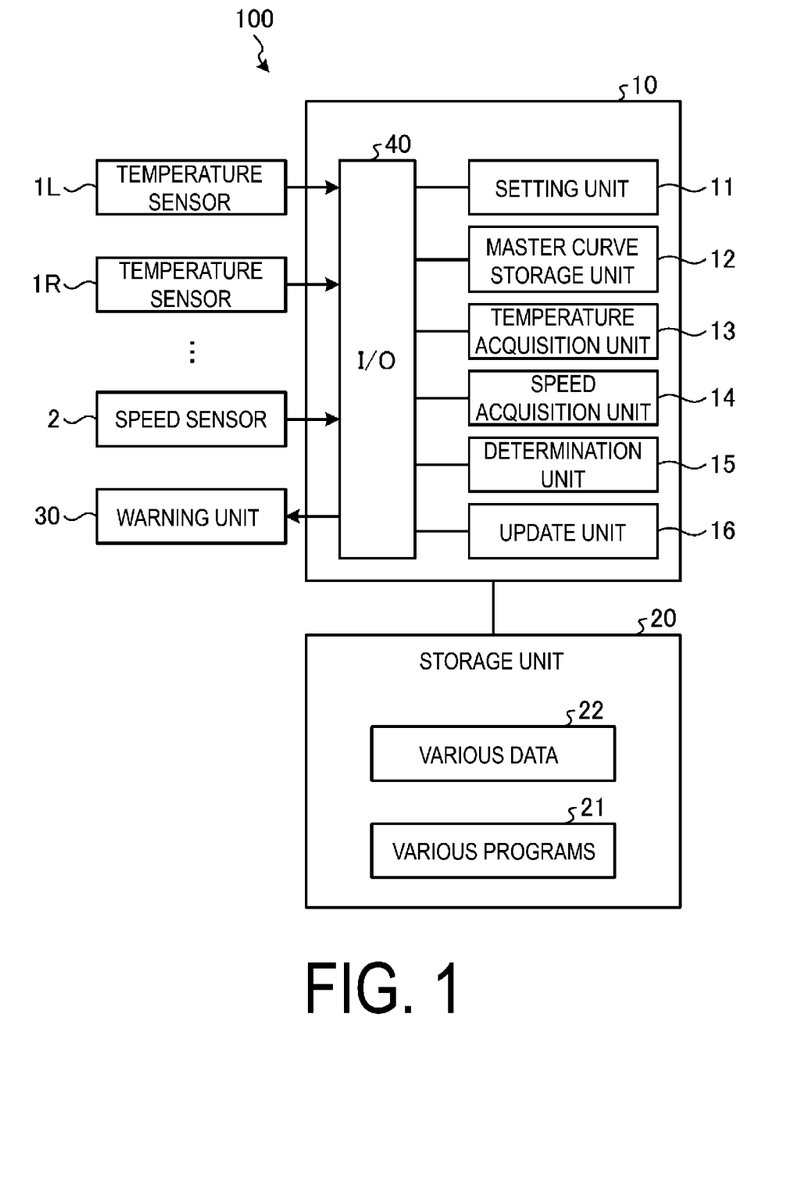
FIG. 1 is a block diagram illustrating a configuration of a tire failure prediction system according to a first embodiment.

A tire failure prediction system according to a first embodiment will now be described.
Configuration FIG. 1 is a block diagram illustrating a configuration of a tire failure prediction system 100 according to the first embodiment. In FIG. 1, the tire failure prediction system 100 includes a control unit 10, a storage unit 20, and a warning unit 30. The control unit 10 is a device that comprehensively controls the operation of the tire failure prediction system 100, and includes, for example, a central processing unit (CPU), a read-only memory (ROM), a random-access memory (RAM), and the like. The control unit 10 includes a setting unit 11, a master curve storage unit 12, a temperature acquisition unit 13, a speed acquisition unit 14, a determination unit 15, an update unit 16, and an input/output unit (I/O) 40. Specifically, the functions of the setting unit 11, the master curve storage unit 12, the temperature acquisition unit 13, the speed acquisition unit 14, the determination unit 15, the update unit 16, and the input/output unit (I/O) 40 are realized by the CPU of the control unit 10 loading and executing programs in the storage unit 20.

The setting unit 11 sets a master curve. The master curve indicates the relationship between the speed of the vehicle on which the tire is mounted and the heat build-up temperature of the tire. The master curve indicates a reference value for a variation in temperature with respect to the vehicle speed. Accordingly, in a case where the tire has no abnormality (the tire is normal), the heat build-up temperature of the tire varies along the master curve as the vehicle speed changes. Hereinafter, a master curve first set by the setting unit 11 is referred to as an initial master curve. For example, a master curve for a tire at an identical mounting position in another vehicle other than the vehicle described above can be set as the initial master curve. In particular, a master curve for a tire at an identical mounting position in a vehicle of an identical type or a vehicle with an identical tire arrangement can be set as the initial master curve. A master curve for another vehicle previously stored in the storage unit 20 may be utilized, or a master curve stored in an external database may be utilized.

When setting the master curve, the setting unit 11 accesses the master curve storage unit 12. The setting of the master curve is processing for storing, in the master curve storage unit 12, data related to a master curve used to determine a tire failure. The master curve set is to be compared with a measured value of the heat build-up temperature of the tire.

The master curve storage unit 12 stores data related to the master curve used to determine a tire failure. The data related to the master curve is data identifying the master curve, for example, a function corresponding to the master curve, a coefficient value indicating the inclination of the master curve, and an address value at which the data indicating the master curve is stored. The storage contents of the master curve storage unit 12 are updated by the update unit 16. The storage contents of the master curve storage unit 12 are referenced by the determination unit 15. In other words, the setting unit 11 stores data related to the master curve in a storage area in which the determination unit 15 can reference the master curve.

Figure 2:
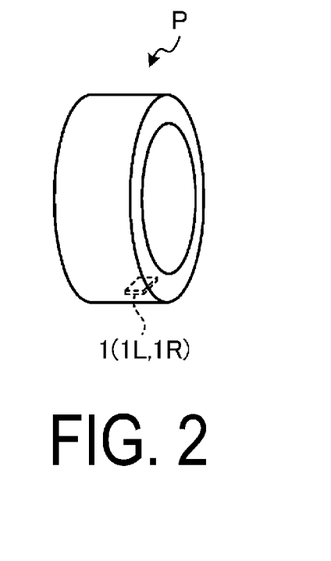
FIG. 2 is a diagram illustrating an example of a placement position of a temperature sensor.

The temperature acquisition unit 13 acquires temperature data from temperature sensors 1L and 1R. The temperature acquisition unit 13 acquires temperature data in a predetermined cycle. The temperature data acquired by the temperature acquisition unit 13 is stored in the storage unit 20. The temperature sensors 1L and 1R are provided in an inner cavity of the tire. FIG. 2 is a diagram illustrating an example of a placement position of a temperature sensor. As illustrated in FIG. 2, the temperature sensor 1 (1L, 1R) is provided in an inner cavity of the tire P. The temperature acquisition unit 13 acquires temperature data from temperature sensors 1L and 1R at one-minute intervals, for example. The temperature acquisition unit 13 wirelessly acquires data from the temperature sensors 1L and 1R. The control unit 10 may acquire data directly from each sensor, or, with a relay provided, the control unit 10 may acquire data from each sensor via the relay. The heat build-up temperature of the tire is obtained by subtracting the atmospheric temperature from the temperature value obtained by the temperature sensor.

Returning to FIG. 1, the speed acquisition unit 14 acquires data regarding the vehicle speed from the speed sensor 2. The speed acquisition unit 14 acquires the speed data from the speed sensor 2 at one minute intervals, for example. The speed acquisition unit 14 acquires the data related to the vehicle speed in a predetermined cycle. The speed acquisition unit 14 acquires the data related to the vehicle speed in a case where the temperature acquisition unit 13 acquires temperature data, for example. The speed sensor 2 detects the vehicle speed, for example, by generating a pulse signal proportional to the number of rotations of the axle in the vehicle. The speed sensor 2 may use a Global Positioning System (GPS) to calculate the vehicle speed. For example, the speed sensor 2 may utilize a Doppler effect of a radio wave received from a positioning satellite to calculate the vehicle speed. Additionally, for example, the speed sensor 2 may calculate the vehicle speed based on a movement distance of the vehicle and the time required for the movement of the vehicle, the distance and time being determined from a radio wave from the positioning satellite.

By referencing the storage contents of the master curve storage unit 12, the determination unit 15 can recognize the master curve set by the setting unit 11. The determination unit 15 determines a tire condition based on the difference between the master curve set by the setting unit 11 and the measured value of the temperature acquired by the temperature acquisition unit 13. As described below, the determination unit 15 determines that the update unit 16 is to perform an update in a case where the difference between the master curve and the measured value of the temperature is a value within a first predetermined range. Additionally, in a case where the difference between the master curve and the measured value of the temperature is a value within a second predetermined range, the determination unit 15 determines that the tire condition is normal (i.e., the tire condition is not abnormal). In a case where the difference between the master curve and the measured value of the temperature is a value exceeding the second predetermined range, the determination unit 15 determines that the tire condition is not normal (i.e., the tire condition is abnormal).

The update unit 16 updates the master curve set by the setting unit 11. Updating the master curve is processing for rewriting the storage contents of the master curve storage unit 12. For example, the update unit 16 sets another master curve that is more appropriate instead of the currently set master curve. More specifically, the update unit 16 overwrites data related to the master curve stored in the master curve storage unit 12, with other data. For example, a function corresponding to the master curve, a coefficient value indicating the inclination of the master curve, and the address value in which the data indicating the master curve is stored are rewritten. Note that changing the coefficient indicating the inclination of the master curve means changing the inclination of the straight line.

The update unit 16 updates the master curve based on a determination result from the determination unit 15. The update unit 16 updates the master curve in a case where the determination unit 15 determines that the tire condition is normal (i.e., the tire condition is not abnormal).

The update unit 16 may overwrite with data identical to the data related to the master curve stored in the master curve storage unit 12. In other words, the update unit 16 may replace data related to the master curve stored in the master curve storage unit 12, with the same data.

The input/output unit (I/O) 40 functions as an input unit that receives data from the temperature sensors 1L, 1R, and the like. Additionally, the input/output unit (I/O) 40 functions as an output unit that outputs data based on a determination result from the determination unit 15.

The storage unit 20 is a device for storing various types of programs 21 and various types of data 22 used for processing in the control unit 10. The storage unit 20 includes, for example, a non-volatile memory or a magnetic storage device. The storage unit 20 may be provided inside the control unit 10, and the control unit 10 and the storage unit 20 may be integrated with each other. The various programs 21 include programs for making determinations described below. The various data 22 include threshold values for making the determinations described below.

The warning unit 30 is a device for outputting a warning. The warning unit 30 outputs a warning based on a warning signal output from the control unit 10. The control unit 10 outputs a warning signal in a case where the determination unit 15 determines that the tire condition is not normal (i.e., the tire condition is abnormal). The warning unit 30, for example, outputs the warning to a driver of the vehicle. The warning is provided by, for example, a voice output or a display output. Additionally, the warning unit 30 may output a warning to an external device. The warning unit 30 may output a warning to the driver of the vehicle and output a warning to the external device. Outputting a warning allows the possibility of a tire failure to be notified to the driver of the vehicle or an external device. Note that the warning unit 30 does not output a warning in a case where the determination unit 15 determines that the tire condition is normal (i.e., the tire condition is not abnormal).

Figure 3:
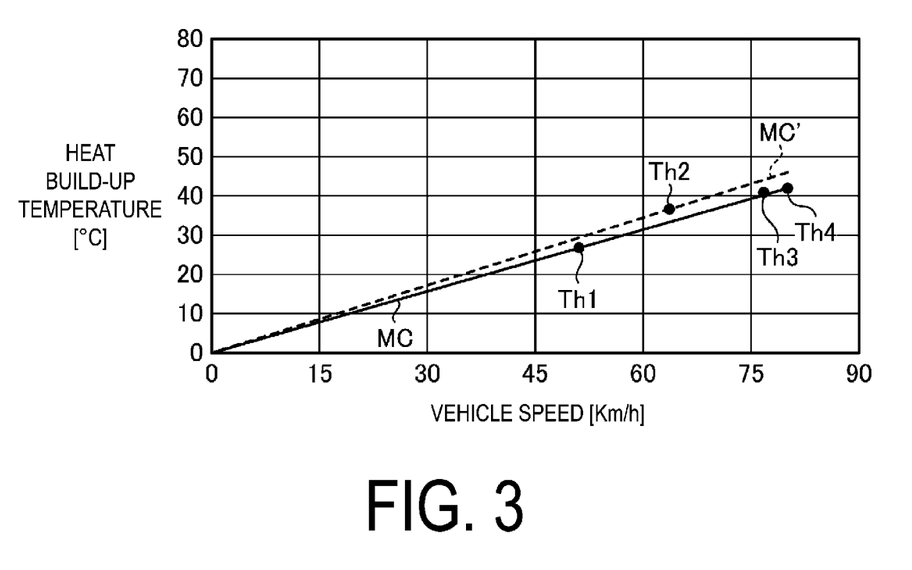
FIG. 3 is a diagram illustrating an example of a master curve set by a setting unit.
Figure 4:
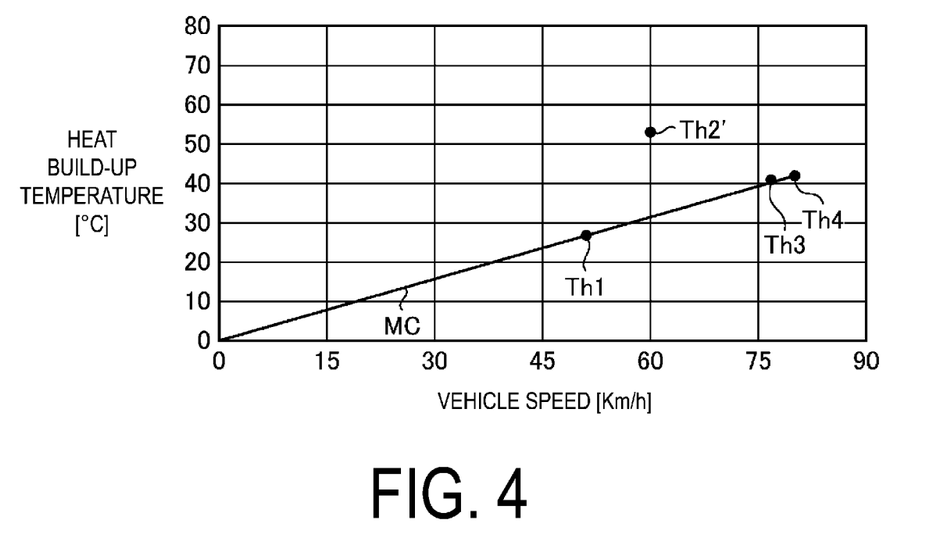
FIG. 4 is a diagram illustrating an example of a master curve set by the setting unit.

FIGS. 3 and 4 are diagrams illustrating an example of a master curve set by the setting unit 11. In FIG. 3, the horizontal axis is the speed (km/h) of the vehicle on which the tire is mounted, and the vertical axis is the heat build-up temperature (° C.) of the tire. In FIG. 3, reference signs Th1, Th2, Th3, and Th4 indicate measured values of the heat build-up temperature with respect to the vehicle speed.

Here, in this example, in a case where the difference between the measured value and the heat build-up temperature obtained from the master curve MC is a value exceeding the second predetermined range (for example, a range of ±20° C.), the system determines that the tire is abnormal (the tire is not normal). In FIG. 3, the measured values Th1, Th2, Th3, and Th4 are values where the differences between the measured values Th1, Th2, Th3, and Th4 and the heat build-up temperature obtained from the master curve MC are within the second predetermined range. Thus, for the measured values Th1, Th2, Th3, and Th4, the tire is determined to be not abnormal (the tire is determined to be normal).

As illustrated in FIG. 3, the measured value Th2 matches the heat build-up temperature obtained from the master curve MC, and thus the present system updates the master curve as illustrated by the dashed line in FIG. 3. An updated master curve MC' passes through the measured value Th2. Thus, the measured value Th2 matches the heat build-up temperature obtained by the updated master curve MC'. That is, the present system updates the master curve in such a manner as to eliminate the difference from the measured value Th2 to match the master curve with the measured value Th2. The present system updates the master curve by, for example, changing a coefficient indicating the inclination of the master curve to eliminate the difference from the measured value Th2 to match the master curve with the measured value Th2.

Additionally, for example, the measured values Th1, Th3, and Th4 illustrated in FIG. 3 match the heat build-up temperature obtained from the master curve MC. Thus, even in a case where the master curve MC is updated in the present system, the master curve MC remains unchanged.

On the other hand, in a case where the measured value does not match the heat build-up temperature obtained from the master curve MC and the difference is a value exceeding the second predetermined range, the present system determines that the tire is abnormal. For example, as illustrated in FIG. 4, in a case where the difference between the measured value Th2' and the heat build-up temperature obtained from the master curve MC is a value exceeding ±20° C. used as the second predetermined range, the present system determines that the tire is abnormal. In a case where the system determines that the tire is abnormal, the present system outputs a warning to the driver or the like.

Update of Master Curve

In the tire failure prediction system of the present example, the heat build-up temperature of the tire is acquired in a predetermined cycle. In the tire failure prediction system of the present example, in a case where the measured value of the heat build-up temperature of the tire does not match the temperature obtained from the master curve and the difference is within the first predetermined range, the master curve is preferably updated. Updating the master curve refers to setting another master curve instead of the already set master curve.

Additionally, in a case where the measured value of the heat build-up temperature of the tire does not match the temperature obtained from the master curve and is a value within the first predetermined range that is close to that temperature, the master curve is preferably updated. For example, in a case where the measured value of the heat build-up temperature of the tire does not match the temperature obtained from the master curve, but the difference is within the range of ±10° C. (i.e., within the first predetermined range), the master curve is updated. Updating the master curve allows setting of a master curve that is closer to an actual variation in heat build-up temperature. This allows determination to be made based on a more appropriate master curve.

Operation Example

Figure 5:
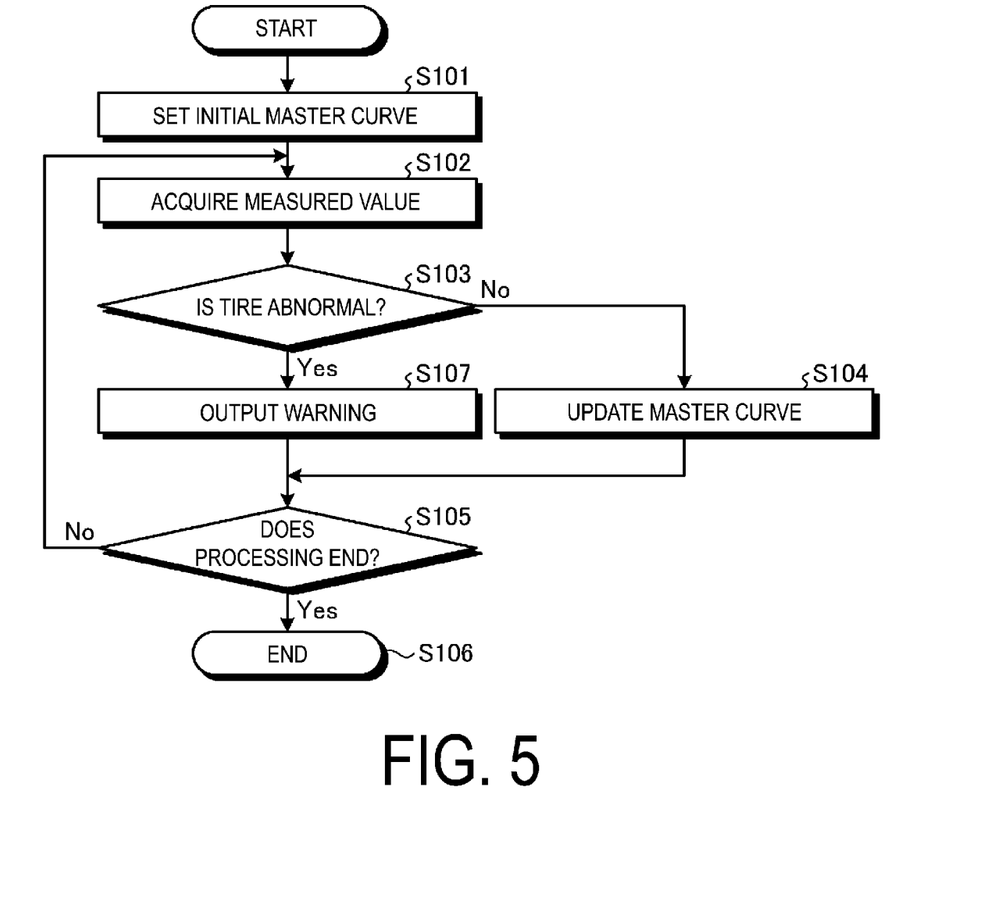
FIG. 5 is a flowchart illustrating an operation example of the tire failure prediction system according to the first embodiment.

FIG. 5 is a flowchart illustrating an operation example of a tire failure prediction system 100 according to the first embodiment. In FIG. 5, for example, in a case where a vehicle power generation device (not illustrated) is started, the tire failure prediction system 100 performs the following processing. The power generation device is, for example, an engine or an electric motor. For example, when it is detected that an ignition switch of the vehicle has been turned on, it may be determined that the power generation device has started.

The tire failure prediction system 100 according to the first embodiment performs processing for each of the tires mounted on the vehicle in accordance with the flowchart illustrated in FIG. 5. The tire failure prediction system 100 periodically performs processing in accordance with the flowchart illustrated in FIG. 5.

In step S101, the tire failure prediction system 100 sets an initial master curve. The initial master curve is set by the setting unit 11. Then, in step S102, the tire failure prediction system 100 acquires the measured value of the heat build-up temperature of the tire and the vehicle speed. The measured value of the heat build-up temperature of the tire is acquired by the temperature acquisition unit 13. The vehicle speed is acquired by the speed acquisition unit 14.

In step S103, the tire failure prediction system 100 determines whether the tire is abnormal based on the difference between the temperature obtained from the vehicle speed acquired by the speed acquisition unit 14 and the master curve set by the setting unit 11, and the heat build-up temperature of the tire acquired by the temperature acquisition unit 13. The determination unit 15 determines whether the tire is abnormal.

In response to the determination in step S103 that the tire is not abnormal (No in step S103), the tire failure prediction system 100 determines that the master curve is to be updated, and updates the master curve in step S104. The master curve is updated by the update unit 16. Subsequently, the tire failure prediction system 100 determines in step S105 whether to end the processing. In step S105, in a case of not ending the processing (No in step S105), the tire failure prediction system 100 returns to step S102 to continue the processing.

In response to the determination, in step S103, that the tire is abnormal (Yes in step S103), the tire failure prediction system 100 outputs a warning in step S107. Subsequently, the tire failure prediction system 100 transitions to step S105 to determine whether to end the processing.

Note that in a case of ending the processing in step S105 (Yes in step S105), the tire failure prediction system 100 transitions to step S106. Thus, the tire failure prediction system 100 ends the processing.

As described above, in a case where, with respect to the vehicle speed, the measured value of the heat build-up temperature of the tire matches the temperature obtained from the master curve or is a value within the second predetermined range that is close to that temperature, it can be determined to be normal. In other words, the tire can be determined to be normal. In a case where the tire is determined to be normal, no warning is given to the driver of the vehicle or the like.

On the other hand, in a case where, with respect to the actual vehicle speed, the measured value of the heat build-up temperature of the tire does not match the heat build-up temperature obtained from the master curve and is a value exceeding the second predetermined range, it can be determined to be abnormal. In other words, the tire can be determined to be abnormal. In a case where the tire is determined to be abnormal, a warning can be given to the driver of the vehicle or the like.

Second Embodiment

Now, a second embodiment of the present system will be described. In response to the determination, in step S103 in FIG. 5, that the tire is not abnormal (the tire is normal), the update unit 16 may refrain from performing an update in a case where the difference is a value within the first predetermined range. For example, in a case where the difference is within the range of ±10° C. (that is, within the first predetermined range), the update unit 16 may refrain from performing the update. In other words, in a case where the tire is determined to be not abnormal (the tire is determined to be normal), when the temperature obtained based on the vehicle speed and the master curve MC does not perfectly match the measured value of the heat build-up temperature of the tire, but the difference is small, the master curve need not be updated. This is because a small difference from the measured value can be considered to be within the margin of error in the measurement of the heat build-up temperature.

On the other hand, in the second embodiment of the present system, in step S103 in FIG. 5, in a case where the tire is determined to be not abnormal (tire is determined to be normal), when the difference is a value exceeding the first predetermined range, the present system updates the master curve. For example, in a case where the difference is a value exceeding the range of ±10° C., the present system updates the master curve. However, for example, in a case where the difference exceeds the range of ±10° C., corresponding to the first predetermined range, and the difference is a value exceeding the range of ±20° C., corresponding to the second predetermined range, the present system determines that the tire is abnormal. In the present system, in a case where the determination unit 15 determines that the tire is abnormal, the warning unit 30 outputs a warning to a driver or the like. In the present system, in a case where the determination unit 15 determines that the tire condition is normal (i.e., the tire condition is not abnormal), the warning unit 30 does not output a warning.

Figure 6:
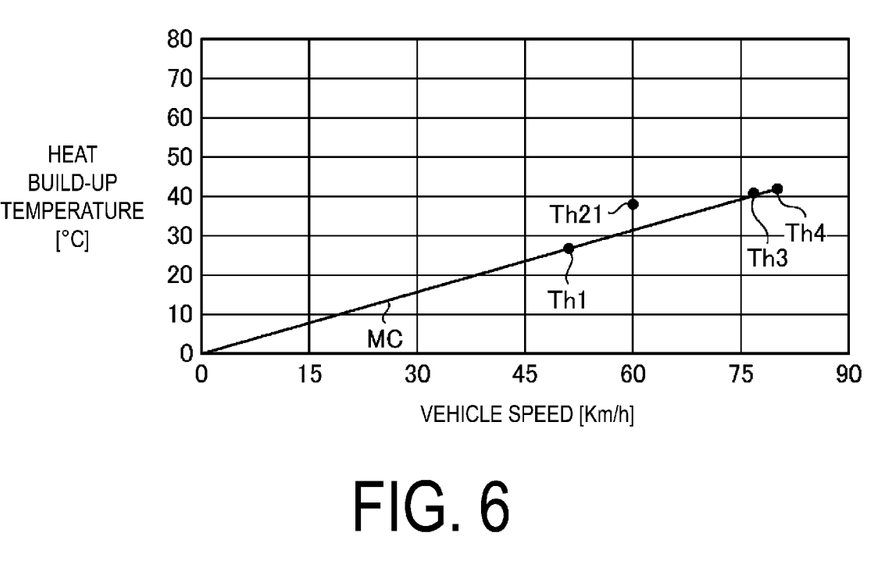
FIG. 6 is a diagram illustrating another example of the master curve.
Figure 7:
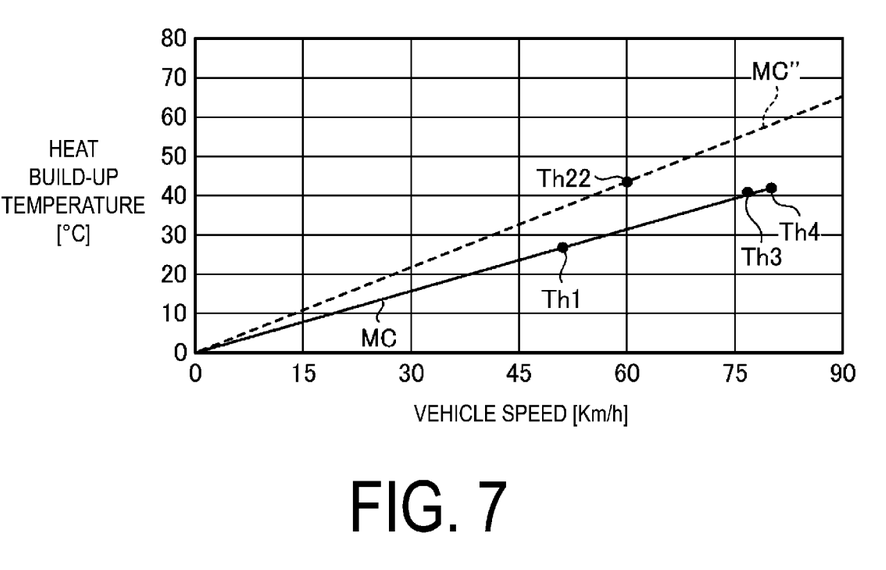
FIG. 7 is a diagram illustrating another example of the master curve.

FIGS. 6 and 7 are diagrams illustrating other examples of master curves. FIG. 6 is a diagram illustrating an example of a master curve set by the setting unit 11 in the second embodiment of the present system. In FIG. 6, the measured values Th1, Th21, Th3, and Th4 are values within the second predetermined range (for example, in the range of ±20° C.) of the difference from the heat build-up temperature obtained by the master curve MC. Thus, for the measured values Th1, Th21, Th3, and Th4, the tire is determined to be not abnormal (the tire is determined to be normal). In this case, the difference between the measured value Th21 and the heat build-up temperature obtained from the master curve MC is a value within the first predetermined range (e.g., in the range of ±10° C.), and thus the master curve MC is not updated.

On the other hand, in a case where the difference is outside the first predetermined range (e.g., the range of ±10° C.), the master curve MC is updated. In a case where the difference between the measured value Th22 and the heat build-up temperature obtained from the master curve MC is within the second predetermined range (e.g., in the range of ±20° C.) (i.e., the tire is not abnormal) but exceeds the first predetermined range (e.g., the range of ±10° C.), the present system updates the master curve as illustrated by the dashed line in FIG. 7. For example, the master curve is updated by changing the coefficient indicating the inclination of the master curve to eliminate the difference from the measured value Th22 to match the master curve with the measured value Th22. Thus, the updated master curve MC" passes through the measured value Th22. Thus, the measured value Th22 matches the heat build-up temperature obtained from the updated master curve MC".

Figure 8:
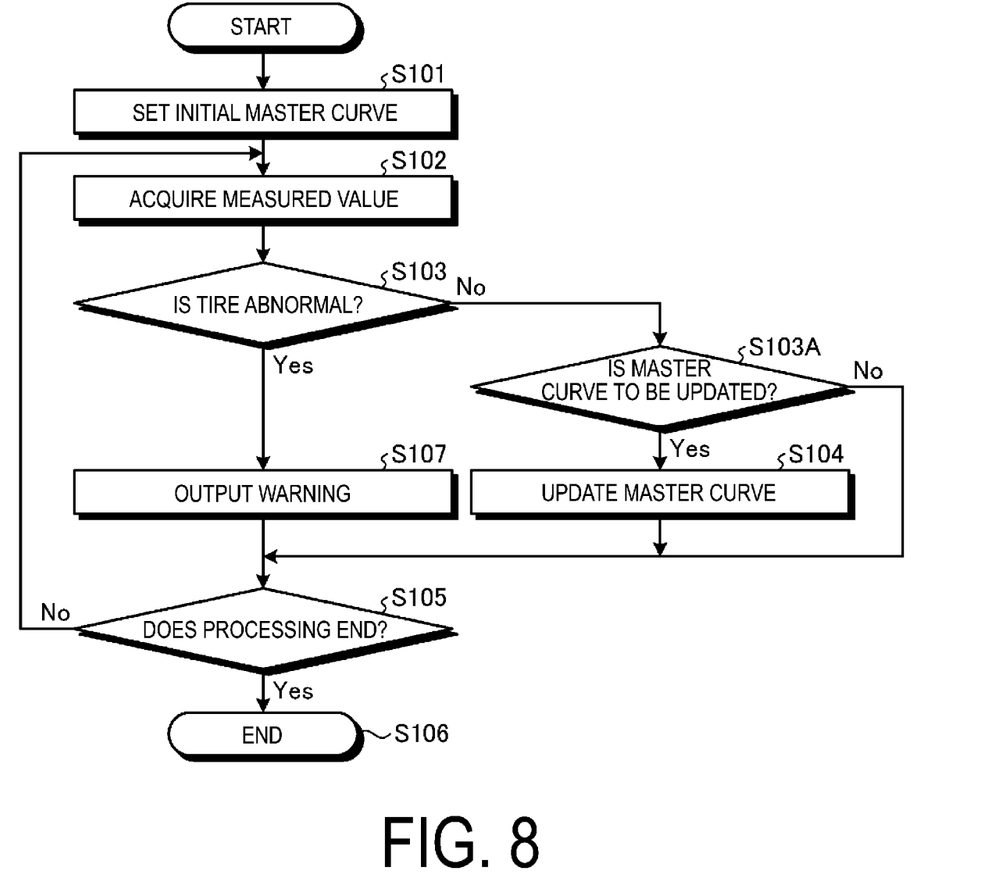
FIG. 8 is a flowchart illustrating an operation example of a tire failure prediction system according to a second embodiment.

FIG. 8 is a flowchart illustrating an operation example of the tire failure prediction system 100 according to the second embodiment. The tire failure prediction system 100 according to the second embodiment performs processing on each of the tires mounted on the vehicle in accordance with the flowchart illustrated in FIG. 8. The tire failure prediction system 100 periodically performs processing in accordance with the flowchart illustrated in FIG. 8. The flowchart illustrated in FIG. 8 differs from the flowchart illustrated in FIG. 5 in that in a case where in step S103, the tire is determined to be not abnormal (No in step S103), the determination unit 15 further determines in step S103A whether to update the master curve.

In step S103A, in a case where the difference is a value within the first predetermined range, the update unit 16 does not perform the update (No in step S103A), and the processing transitions to step S105. On the other hand, in step S103A, in a case where the difference is a value exceeding the first predetermined range, the update unit 16 performs the update (Yes in step S103A), and the processing transitions to step S104.

As described above, instead of updating the master curve every time, the tire failure prediction system 100 according to the second embodiment refrains from updating the master curve for a slight difference, enabling a reduction in power consumption.

Third Embodiment

A third embodiment of the present system will now be described. For a tire mounted on the vehicle, the tire failure prediction system 100 references data regarding the heat build-up temperature of another tire mounted on an identical axle at a symmetrical position to determine whether the tire has an abnormality. In other words, in step S103 in FIG. 5 and in step S103 in FIG. 8, when determining whether the tire is abnormal, the determination may be made by referencing data regarding the heat build-up temperature of a second tire, the second tire being mounted on the identical axle at the symmetrical position.

In other words, in a case where the difference between the measured value of the heat build-up temperature of one tire and the heat build-up temperature obtained from the master curve is comparable to the difference for another tire mounted at a symmetrical position on the same axle, the difference for the one tire can be determined to be not abnormal. On the other hand, in a case where the difference between the measured value of the heat build-up temperature of a tire P and the heat build-up temperature obtained from the master curve is significantly different from the difference for another tire P' mounted at a symmetrical position with respect to the tire P on the same axle as the axle on which the tire P is mounted, the difference for the tire P can be determined to be abnormal. For example, in a case where the difference exceeds 10% of the heat build-up temperature of the tire P and the difference exceeds 10% of the difference for the other tire P', the tire may be determined to be abnormal.

Figure 9:
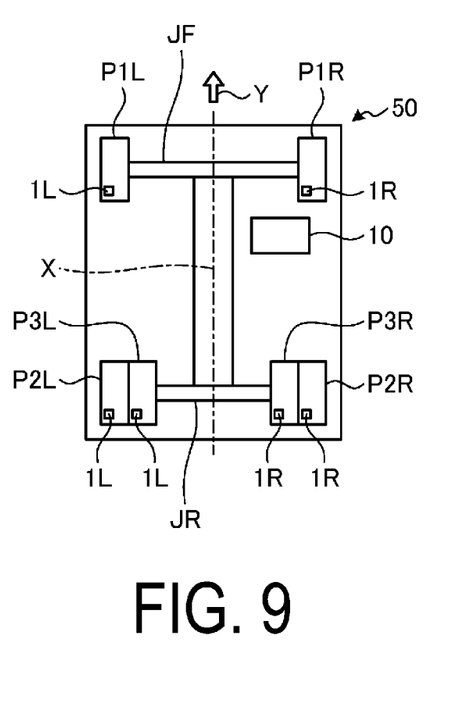
FIG. 9 is a diagram illustrating an example of positions where temperature sensors are provided.

FIG. 9 is a diagram illustrating an example of positions where the temperature sensors 1L and 1R are provided. In the present example, the vehicle 50 includes two front wheels on one axle and four rear wheels on one axle. The advancement direction of the vehicle 50 corresponds to the direction of arrow Y. On an axle JF for the front wheels, a tire P1L is mounted on the left side in the advancement direction and a tire P1R is mounted on the right side in the advancement direction. On an axle JR for the rear wheels, a tire P2L is mounted on a left outer side in the advancement direction and a tire P2R is mounted on a right outer side in the advancement direction. Additionally, on the axle JR for the rear wheels, a tire P3L is mounted on a left inner side in the advancement direction and a tire P3R is mounted on a right inner side in the advancement direction. The two left tires and the two right tires mounted on the rear wheels constitute double tires. The double tires have a configuration in which two tires are respectively mounted on a vehicle outer side and a vehicle inner side of one wheel. Note that the tires mounted on the vehicle may be collectively referred to as the tires P.

In the present embodiment, for tires mounted at symmetrical positions in the vehicle, the above-described difference is compared to determine abnormality. "Mounted at symmetrical positions" refers to the first tire and the second tire being mounted on the same axis at left-right symmetrical positions with respect to an imaginary line X from the front side (advancement direction) toward the rear side (reverse direction).

In a vehicle including two front wheels on one axle, a first tire (for example, the left tire P1L) mounted on the axle JF for the front wheels and a second tire (for example, the right tire P1R) mounted on the same axle JF for the front wheels are mounted at symmetrical positions.

In a vehicle including four rear wheels on one axle, a first tire mounted on the outer side of the axle JR for the rear wheels (for example, the left outer tire P2L) and a second tire (for example, the right outer tire P2R) mounted on the outer side of the same axle JR of the rear wheels are mounted at symmetrical positions. Additionally, a first tire (for example, the left inner tire P3L) mounted on the inner side of the axle JR for the rear wheels and a second tire (for example, the right inner tire P3R) mounted on the inner side of the same axle for the rear wheels are mounted at symmetrical positions. Note that in FIG. 9, illustration of the storage unit 20 is omitted.

Figure 10:
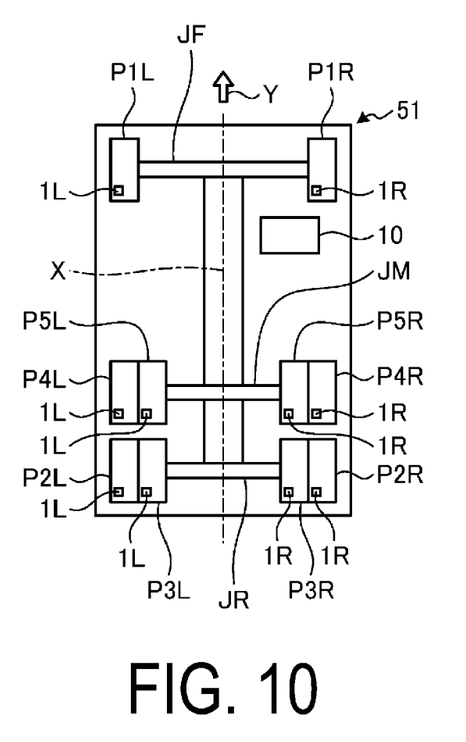
FIG. 10 is a diagram illustrating another example of positions where the temperature sensors are provided.

FIG. 10 is a diagram illustrating another example of positions where the temperature sensors 1L and 1R are provided. In the present example, a vehicle 51 includes two front wheels on one axle and eight rear wheels on two axles. The advancement direction of the vehicle 51 corresponds to the direction of arrow Y. On the axle JF for the front wheels, the tire P1L is mounted on the left side in the advancement direction and the tire P1R is mounted on the right side in the advancement direction. On the rear-side axle JR for the rear wheels, the tire P2L is mounted on the left outer side in the advancement direction, and the tire P2R is mounted on the right outer side in the advancement direction. Additionally, on the rear-side axle JR for the rear wheels, the tire P3L is mounted on the rear inner side in the advancement direction, and the tire P3R is mounted on the right inner side in the advancement direction. On a front-side axle JM for the rear wheels, a tire P4L is mounted on the left outer side in the advancement direction, and a tire P4R is mounted on the right outer side in the advancement direction. Additionally, on the front-side axle JM for the rear wheels, a tire P5L is mounted on the left inner side in the advancement direction, and a tire P5R is mounted on the right inner side in the advancement direction. The two left tires on each of the front and rear sets of the rear wheels and the two right tires on each of the front and rear sets of the rear wheels constitute double tires. The double tires have a configuration in which two tires are respectively mounted on a vehicle outer side and a vehicle inner side of one wheel. Thus, in the case of a double tire, two tires are mounted on the same wheel.

In FIG. 10, a first tire (for example, the left tire P1L) mounted on the axle JF for the front wheels, and a second tire (for example, the right tire P1R) mounted on the same axle JF for the front wheels are mounted at symmetrical positions.

A first tire (for example, the left outer tire P2L) mounted on the outer side of rear-side axle JR for the rear wheels and a second tire (for example, the right outer tire P2R) mounted on the outer side of the same rear-side axle JR for the rear wheels are mounted at symmetrical positions. Additionally, a first tire (for example, the left inner tire P3L) mounted on the inner side of rear-side axle JR for the rear wheels and a second tire (for example, the right inner tire P3R) mounted on the inner side of the same rear-side axle JR for the rear wheels are mounted at symmetrical positions.

A first tire (for example, a left outer tire P4L) mounted on the outer side of the front-side axle JM for the rear wheels and a second tire (for example, a right outer tire P4R) mounted on the outer side of the same front-side axle JM for the rear wheels are mounted at symmetrical positions. Additionally, a first tire (for example, a left inner tire P5L) mounted on the inner side of the front-side axle JM for the rear wheels, and a second tire (for example, a right inner tire P5R) mounted on the inner side of the front-side axle JM for the rear wheels are mounted at symmetrical positions.

As illustrated in FIG. 10, also for a vehicle including two front wheels on one axle and eight rear wheels on two axles, the above-described difference is compared between the first tire and the second tire mounted on the same axle at left-right symmetrical positions to determine whether there is an abnormality.

In the present example, the temperature sensors 1L and 1R are provided inside the tires. The control unit 10 wirelessly acquires data of the temperature sensors 1L and 1R. The control unit 10 may acquire data directly from each sensor, or, with a relay provided, the control unit 10 may acquire data from each sensor via the relay. Note that in FIG. 10, illustration of the storage unit 20 is omitted.

For other vehicles with different wheel arrangements as well, a temperature sensor is provided in each of the tires P, and it is determined whether the tire P has an abnormality by referring to the data regarding the heat build-up temperature of another tire mounted at a symmetrical position on the same axle.

Fourth Embodiment

The temperature acquisition unit 13 acquires temperature data in a predetermined cycle. The speed acquisition unit 14 acquires the data related to the vehicle speed in a predetermined cycle. Thus, the control unit 10 can determine the tire condition in a predetermined cycle.

Additionally, based on the determination result from the determination unit 15, the tire condition may be determined in a cycle shorter than the predetermined cycle. For example, in a case where the difference between the measured value and the heat build-up temperature obtained from the master curve MC is greater than a predetermined threshold value, the condition of the tire may be determined in a shorter cycle. For example, in a case where data regarding the temperature and data regarding the vehicle speed are acquired at intervals of five minutes and the tire condition is determined, the data may be acquired at shorter intervals of one minute to determine the tire condition.

More specifically, in a case where the difference exceeds the range of ±10° C., corresponding to the first predetermined range, the data regarding the temperature and the data regarding the vehicle speed may be acquired in a shorter cycle to determine the tire condition. In this way, tire abnormality can be detected early by changing the cycle for determining the tire condition to a shorter cycle.

MODIFIED EXAMPLES

Although the case has been described in which the master curve storage unit 12 is provided in the control unit 10, the master curve storage unit 12 may be provided at any other position. For example, the master curve storage unit 12 may be provided in the storage unit 20. Additionally, the master curve storage unit 12 may be provided in the setting unit 11 or the determination unit 15.

The case in which the temperature varies linearly with respect to the vehicle speed has been described for ease of explanation. The temperature may vary along a curve with respect to the vehicle speed. Even in such a case, by updating the master curve, it is possible to set a master curve that is closer to the actual change in heat build-up temperature. This allows determination to be made based on a more appropriate master curve.

Tire Failure Prediction Method

According to the tire failure prediction system described above, a tire failure prediction method as described below is realized. Specifically, a tire failure prediction method is implemented that includes a first step of setting a predetermined master curve indicating a relationship between a speed of a vehicle on which a tire is mounted and a heat build-up temperature of the tire, a second step of determining a tire condition of the tire based on a difference between the master curve set in the first step and the measured value of the heat build-up temperature of the tire, and a third step of updating the master curve set in the first step. According to this method, abnormality determination can be performed with higher accuracy to predict failure.

Additionally, in the third step, the master curve is preferably updated in a case where the tire is determined to be normal in the second step. This allows determination to be made based on a more appropriate master curve.

The method may further include a fourth step of outputting a warning in a case where the tire is determined to be abnormal in the second step. Outputting a warning allows the possibility of a tire failure to be notified to the driver of the vehicle or an external device.

The invention claimed is:

1. A tire failure prediction system, comprising:
a setting unit configured to set a predetermined master curve indicating a relationship between a speed of a vehicle on which a tire is mounted and a heat build-up temperature of the tire;
a determination unit configured to determine a tire condition of the tire based on a difference between the master curve set by the setting unit and a measured value of the heat build-up temperature of the tire; and
an update unit configured to update the master curve set by the setting unit when a difference between the master curve and the measured value of the heat build-up temperature of the tire exceeds a predetermined range,
wherein the master curve is not updated when the difference between the master curve set by the setting unit and the measured value of the heat build-up temperature of the tire is within the predetermined range.

2. The tire failure prediction system according to claim 1, wherein the update unit updates the master curve in a case where the determination unit determines that the tire is normal.

3. The tire failure prediction system according to claim 1, further comprising:
a warning unit configured to output a warning in a case where the determination unit determines that the tire is abnormal.

4. The tire failure prediction system according to claim 1, wherein
the update unit:
updates the master curve in a case where a difference between the master curve set by the setting unit and the measured value of the heat build-up temperature of the tire exceeds a predetermined range, and
refrains from updating the master curve in a case where the difference between the master curve set by the setting unit and the measured value of the heat build-up temperature of the tire is equal to or less than a predetermined threshold value.

5. The tire failure prediction system according to claim 1, wherein
the vehicle comprises a plurality of the tires,
the setting unit sets the master curve for each of the plurality of the tires, and
the determination unit compares a difference between the master curve set by the setting unit and the measured value of the heat build-up temperature of a first tire with a difference between the master curve for an other tire and the measured value of the heat build-up temperature of the other tire to determine the tire condition of the first tire.

6. The tire failure prediction system according to claim 5, wherein the determination unit compares the differences for the tires mounted at positions that are symmetrical in the vehicle and determines the tire condition of the tire.

7. The tire failure prediction system according to claim 1, wherein the determination unit determines the tire condition of the tire in a predetermined cycle and based on a determination result from the determination unit, determines the tire condition of the tire in a cycle shorter than the predetermined cycle.

8. The tire failure prediction system according to claim 1, wherein the setting unit sets the master curve for the tire of the vehicle based on the master curve for a tire of another vehicle other than the vehicle.

9. The tire failure prediction system according to claim 2, further comprising:
a warning unit configured to output a warning in a case where the determination unit determines that the tire is abnormal.

10. The tire failure prediction system according to claim 9, wherein
the update unit:
updates the master curve in a case where a difference between the master curve set by the setting unit and the measured value of the heat build-up temperature of the tire exceeds a predetermined range, and
refrains from updating the master curve in a case where the difference between the master curve set by the setting unit and the measured value of the heat build-up temperature of the tire is equal to or less than a predetermined threshold value.

11. The tire failure prediction system according to claim 10, wherein
the vehicle comprises a plurality of the tires,
the setting unit sets the master curve for each of the plurality of the tires, and
the determination unit compares a difference between the master curve set by the setting unit and the measured value of the heat build-up temperature of the tire with a difference between the master curve for an other tire and the measured value of the heat build-up temperature of the other tire to determine the tire condition of the tire.

12. The tire failure prediction system according to claim 11, wherein the determination unit compares the differences for the tires mounted at positions that are symmetrical in the vehicle and determines the tire condition of the tire.

13. The tire failure prediction system according to claim 12, wherein the determination unit determines the tire condition of the tire in a predetermined cycle and based on a determination result from the determination unit, determines the tire condition of the tire in a cycle shorter than the predetermined cycle.

14. The tire failure prediction system according to claim 13, wherein the setting unit sets the master curve for the tire of the vehicle based on the master curve for a tire of another vehicle other than the vehicle.

15. A tire failure prediction method, comprising:
a first step of setting a predetermined master curve indicating a relationship between a speed of a vehicle on which a tire is mounted and a heat build-up temperature of the tire;
a second step of determining a tire condition of the tire based on a difference between the master curve set in the first step and a measured value of the heat build-up temperature of the tire;
a third step of updating the master curve set in the first step; and
a fourth step of updating the master curve set in the first step when a difference between the master curve and the measured value of the heat build-up temperature of the tire exceeds a predetermined range, wherein
the master curve is not updated when the difference between the master curve set by the setting unit and the measured value of the heat build-up temperature of the tire is within the predetermined range.

16. A tire failure prediction system, comprising:

a setting unit configured to set a predetermined master curve indicating a relationship between a speed of a vehicle on which a tire is mounted and a heat build-up temperature of the tire, the setting unit being configured to obtain the heat build-up temperature of the tire based on data acquired by a temperature sensor provided on an inner cavity surface of a tire;

a determination unit configured to determine a tire condition of the tire based on a difference between the master curve set by the setting unit and a measured value of the heat build-up temperature of the tire; and an update unit configured to update the master curve set by the setting unit;

the update unit being configured to update the master curve when a difference between the master curve set by the setting unit and the measured value of the heat build-up temperature of the tire exceeds a predetermined range, wherein the master curve is not updated by the update unit when the difference between the master curve set by the setting unit and the measured value of the heat build-up temperature of the tire is within the predetermined range.

17. A tire failure prediction method, comprising:

a first step of setting a predetermined master curve indicating a relationship between a speed of a vehicle on which a tire is mounted and a heat build-up temperature of the tire;

a second step of obtaining a measured value of the heat build-up temperature of the tire based on data acquired by a temperature sensor provided on an inner cavity surface of a tire;

a third step of determining a tire condition of the tire based on a difference between the master curve set in the first step and the measured value of the heat build-up temperature of the tire; and a fourth step of updating the master curve set in the first step when a difference between the master curve and the measured value of the heat build-up temperature of the tire exceeds a predetermined range, wherein the master curve is not updated when the difference between the master curve set by the setting unit and the measured value of the heat build-up temperature of the tire is within the predetermined range.

* * * * *